United States Patent
Hammond

(10) Patent No.: US 6,378,081 B1
(45) Date of Patent: *Apr. 23, 2002

(54) POWER CONSERVATION WITHOUT PERFORMANCE REDUCTION IN A POWER-MANAGED SYSTEM

(75) Inventor: Michael D. Hammond, Dakota Dunes, SD (US)

(73) Assignee: Gateway, Inc., N. Sioux City, SD (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/164,762

(22) Filed: Oct. 1, 1998

(51) Int. Cl.[7] ................................................ G06F 9/00
(52) U.S. Cl. .......................................... 713/501; 712/43
(58) Field of Search .................... 713/323, 324, 713/322, 500, 501, 502, 503, 340, 310; 345/467; 714/47

(56) References Cited

U.S. PATENT DOCUMENTS

| 5,222,239 | A | | 6/1993 | Rosch ........................ 395/750 |
|---|---|---|---|---|
| 5,369,771 | A | | 11/1994 | Gettel ........................ 395/750 |
| 5,408,639 | A | | 4/1995 | Gullick et al. ............... 395/550 |
| 5,426,755 | A | | 6/1995 | Yokouchi et al. ........... 395/425 |
| 5,438,681 | A | | 8/1995 | Mensch, Jr. ................. 395/800 |
| 5,483,659 | A | | 1/1996 | Yamamura ................... 395/800 |
| 5,511,205 | A | * | 4/1996 | Kannan et al. ............. 713/324 |
| 5,564,015 | A | * | 10/1996 | Bunnell ........................ 714/47 |
| 5,623,647 | A | * | 4/1997 | Maitra ........................ 713/501 |
| 5,692,204 | A | * | 11/1997 | Rawson et al. ............. 713/340 |
| 5,826,092 | A | * | 10/1998 | Flannery ..................... 713/324 |
| 5,930,516 | A | * | 7/1999 | Watts, Jr. et al. .......... 713/322 |
| 5,996,083 | A | * | 11/1999 | Gupta et al. ................ 713/322 |
| 6,016,548 | A | * | 1/2000 | Nakamura et al. ......... 713/323 |
| 6,029,249 | A | * | 2/2000 | Atkinson .................... 713/323 |
| 6,052,792 | A | * | 4/2000 | Mensch, Jr. ................ 713/322 |
| 6,081,901 | A | * | 6/2000 | Dewa et al. ................ 713/300 |

* cited by examiner

Primary Examiner—Larry D. Donaghue
(74) Attorney, Agent, or Firm—Mark S. Walker; Rodney L. Lacy; Schwegman Lundberg Woessner & Kluth

(57) ABSTRACT

Power conservation without performance reduction in a power-managed system is disclosed. A method according to one embodiment of the invention includes three steps. In the first step, it is determined whether a computer program running on a computer is substantially memory-intensive or substantially compute-intensive. In a second step, the clock speed of the computer system is increased, and the number of memory access wait states of the computer system is adjusted incident to determining that the computer program is substantially compute-intensive. In a third step, the clock speed of the computer system is decreased, and the number of memory access wait states of the computer system is adjusted incident to determining that the computer program is substantially memory-intensive.

17 Claims, 3 Drawing Sheets

POWER CONSERVATION WITHOUT PERFORMANCE REDUCTION IN A POWER-MANAGED SYSTEM

FIELD OF THE INVENTION

This invention relates generally to reducing power consumption in computers, and more particularly to power conservation without performance reduction in a power-managed system.

BACKGROUND OF THE INVENTION

Portable and lap-top computers have become widely used and are increasing in popularity. An advantage of such computers is that they can be operated with the use of batteries without the need for an external power supply. A limitation faced by these portable computers is that their batteries have a limited life. A typical battery pack generally needs to be recharged after every two-to-four hours of use. Thus, an efficient power management scheme is essential in order to allow these computers to run as long as possible without requiring the recharging of their batteries. Power management has also become an issue with respect to desktop and floor-standing computers because it is increasingly important to build environmentally friendly computers that consume less power. In addition, reduced power consumptions also lowers heat dissipation and increases the reliability of a system.

A common method for power management for portable computing systems and environmentally friendly desktops and floor-standing systems currently involves the reduction of the processor clock speed, either during periods of inactivity or on a continuous basis. The performance of a computing system is largely determined by the speed at which the processor can read and write to system memory. In many computing systems, performance is enhanced through the use of a high-speed memory cache, external to the processor, that minimizes the performance impact of using slower memory, such as dynamic random access memory (DRAM), for the system memory.

In many power-managed systems, an external, high-speed memory cache is not employed due to power, space or cost limitations. This means that the performance of the system is largely determined by how many clock cycles are required for the processor to read from and write to the system memory. The number of clock cycles required is constant in today's systems and is based on the minimum number of complete clock cycles (or partial clock cycles in some specialized systems) that are needed to meet the worst-case access timing of the system memory subsystem when the processor is running at its maximum speed. In power-managed computing systems that employ processor clock speed reduction for power management, the number of clock cycles used for system memory access, at reduced clock speeds, remains the same.

Based on this prior art technology, better power consumption management in computerized systems is always desirable; hence, any power consumption management strategy that extends battery life without reducing performance is useful for implementation in computerized systems.

SUMMARY OF THE INVENTION

The above-identified needs as well as other needs, shortcomings and problems are addressed by the present invention, which will be understood by reading and studying the following specification. The invention describes the conservation of power while minimally reducing performance in a power-managed computer system. In one embodiment of the invention, a method includes three steps. In the first step, the nature of the computer program is determined. The program has a nature selected from the group essentially consisting of substantially memory-intensive and substantially computer-intensive. In the second step, the clock speed of the computer system is increased and the number of memory access wait states of the computer system is adjusted incident to determining that the nature of the computer program is substantially computer-intensive. In the third step, the clock speed of the computer system is decreased and the number of memory access wait states of the computer system is decreased incident to determining that the nature of the computer program is substantially memory-intensive.

Thus, compute-intensive activities running on a computer system are run at full processor speed while memory-intensive activities are run at a reduced processor speed. Desirably, while the computer is running at this reduced speed, the memory wait states are adjusted so that memory subsystem access occur at the same speed as they would at full processor speed. This results in power savings with little or no performance reduction.

In different embodiments of the invention, methods, computers (i.e., information handling systems), and computer-readable storage media of varying scope are described. Still other and further embodiments, aspects and advantages of the invention will become apparent by reference to the drawings and by reading the following detailed description.

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the appended claims.

Figure 1:
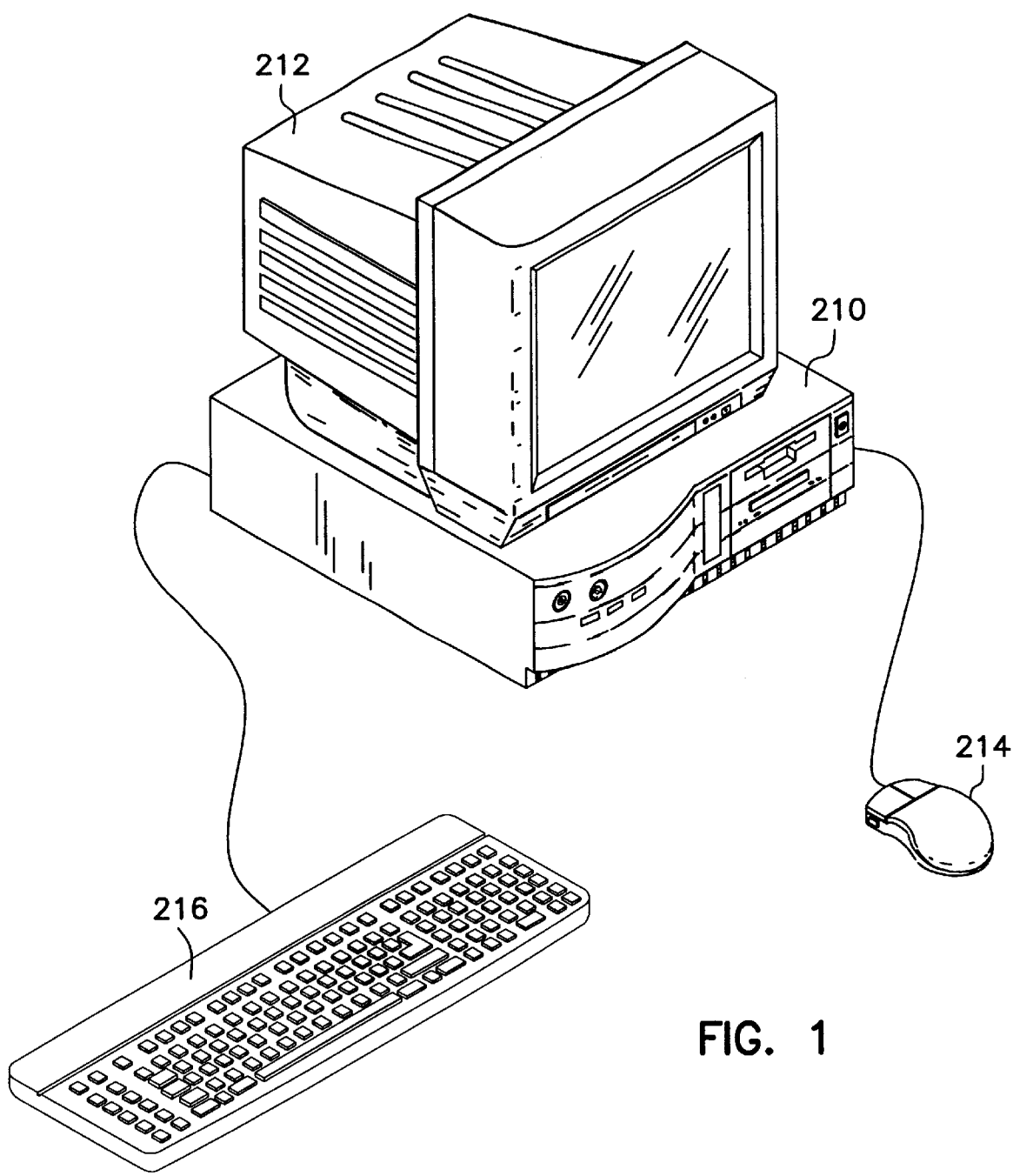
FIG. 1 is a diagram of a computerized system in conjunction with which embodiments of the invention may be implemented.

Referring first to FIG. 1, a diagram of a computerized system in conjunction with which embodiments of the invention may be implemented is shown. Computer 210 of FIG. 1 is operatively coupled to monitor 212, pointing device 214, and keyboard 216. Computer 210 includes a processor (such as an Intel Pentium processor), random-access memory (RAM) (such as at least thirty-two megabytes), read-only memory (ROM), and one or more storage devices, such as a hard disk drive, a floppy disk drive (into which a floppy disk can be inserted), an optical disk drive, and a tape cartridge drive. The memory, hard drives, floppy disks, etc., are types of computer-readable media. The invention is not particularly limited to any type of computer 210. Computer 210 in one embodiment is a PC-compatible computer running a version of the Microsoft Windows operating system. The construction and operation of such computers are well known within the art.

Monitor 212 permits the display of information, including computer, video and other information, for viewing by a user of the computer. The invention is not limited to any particular monitor 212, and monitor 212 is one type of display device that may be used by the invention. Such monitors include cathode ray tube (CRT) displays, as well as flat panel displays such as liquid crystal displays (LCD's). Pointing device 214 permits the control of the screen pointer provided by the graphical user interface of operating systems such as versions of Microsoft Windows. The invention is not limited to any particular pointing device 214. Such pointing devices include mouses, touch pads, trackballs, remote controls and point sticks. Finally, keyboard 216 permits entry of textual information into computer 210, as known within the art, and the invention is not limited to any particular type of keyboard.

Figure 2:
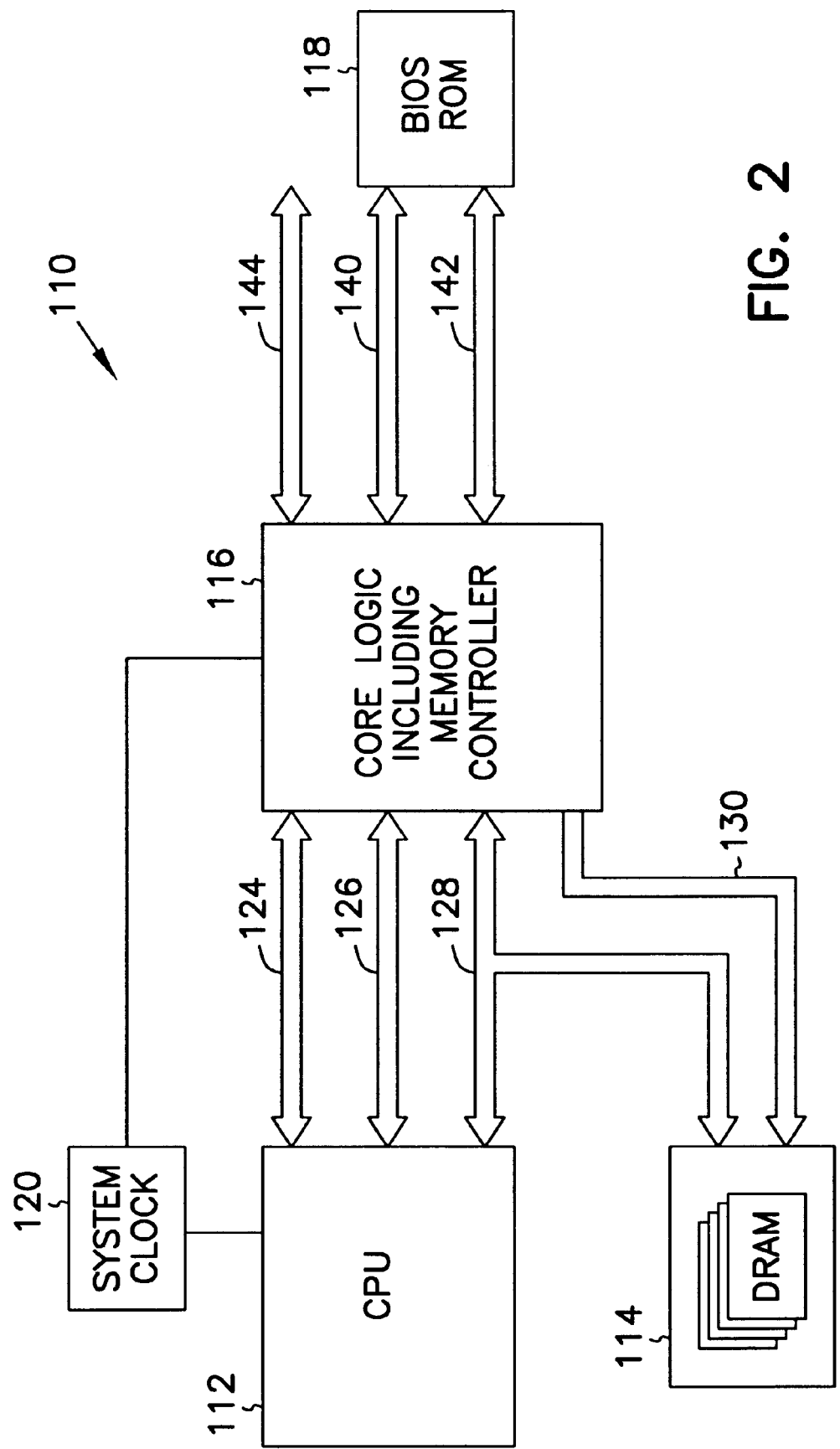
FIG. 2 is a block diagram of the computerized system of FIG. 1 in more detail, according to one embodiment of the invention; and, FIG. 3 is a flowchart of a computerized method according to one embodiment of the invention.

Referring next to FIG. 2, a block diagram of the computerized system of FIG. 1 in more detail, according to one embodiment of the invention, is shown. The computer system 110 includes a central processing unit (CPU) 112, memory system 114, memory controller and core logic 116, and a basic input/output (BIOS) ROM 118. A programmable system clock provides timing pulses to at least the CPU 112 and the memory controller to synchronize both devices for transfer of data. CPU 112 is coupled to the memory controller 116 by a control bus 124, address bus 126, and data bus 128.

Memory controller and core logic 116 may include the power-management system in one embodiment of the invention. In such an embodiment, the CPU 112 has at least two clock speeds, and the memory system 114 has a number of memory access wait states. The power-management system thus can adjust the speed of the CPU and the number of memory access wait states incident to determining whether one or more computer programs running on the computer are substantially memory intensive or substantially compute intensive.

Memory controller 116 in one embodiment is an application specific integrated circuit (ASIC) part number 82C465MV from Opti Corporation. It is coupled to the DRAM 114 by data bus 128 and memory address bus 130 through which it requests data from the DRAM 114 and provides refresh signals to ensure that the data in DRAM 114 is refreshed and does not dissipate. The memory controller 116 is also coupled to BIOS 118 via ISA data bus 140 and ISA address bus 142. Memory controller 116 also provides for control of the ISA bus via an ISA control bus 144.

Memory controller 116 contains several registers for storing system configuration information. In particular, several registers are used to specify whether parity will be used, the memory size for each bank of memory, refresh rates and the number of waits states for the memory controller to initiate prior to informing CPU 112 that data satisfying a memory request is available from DRAM 114, or will be available during the next CPU cycle. This information is passed onto the CPU by means of lowering a NOT READY line in control bus 124. The CPU, in the following cycle, will then latch the data from DRAM 114 near the end of the cycle.

When the personal computer system of FIG. 2 is switched on, BIOS 118 provides instructions to CPU 112 causing it to run through a series of system checks or "diagnostics" to test if a number of essential system components exist and are functioning properly. The BIOS also provides commands for storage of parameters that are necessary in order for programs to run. For instance, information such as input/output ports, type of display monitor, system clock speed, and the number of waits states typically must be provided before a personal computer system is operational. These parameters can be modified as the software or hardware needs of a user changes.

Figure 3:
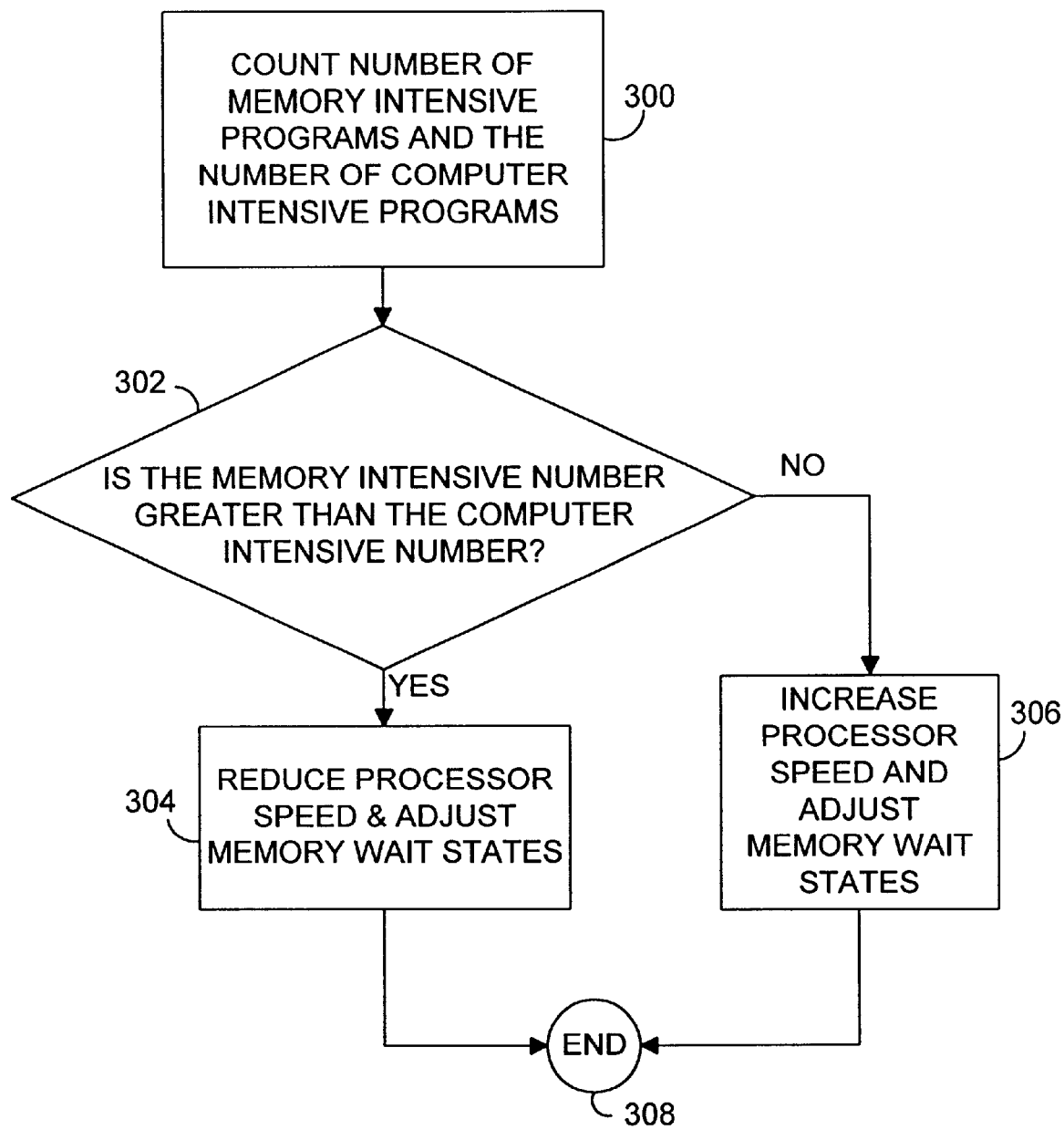

Referring finally to FIG. 3, a flowchart of a computerized method according to one embodiment of the invention is shown. In step 300, the number of memory-intensive programs versus the number of compute-intensive programs running on a power-managed computer is counted. Note in the case where only one program is running, in step 300 it is determined whether this program is compute-intensive or memory-intensive. The invention is not particularly limited to the manner by which programs running on the computer are determined to be compute-intensive or memory-intensive. In one embodiment, input is received from a user of the computer as to whether a program is substantially memory-intensive or substantially compute-intensive. In another embodiment, the computer system monitors the activity level of the central processing unit and the activity level of the memory while a given program or programs are running to determine if the program or programs are compute-intensive or memory-intensive. Such monitoring is known within the art. Compute-intensive tasks refer to those that use the processor more substantially than the memory subsystem, and memory-intensive tasks refer to those that use the memory subsystem more substantially than the processor.

In step 302, if the number of memory-intensive programs is greater than the number of compute-intensive programs, or if the only program running on the computer is memory intensive, the method proceeds to step 304. In step 304, the clock speed of the computer system is decreased, and the number of memory access wait states of the computer system is adjusted. The clock speed is reduced because the program(s) running on the computer is largely memory intensive, such that the processor speed is not as important in determining the speed in which the programs will be run. Furthermore, desirably the number of memory access wait states is decreased, so that the memory intensive activities may be performed more quickly. The method then ends at step 308.

If, however, in step 302, the number of memory-intensive programs is less than the number of compute-intensive programs, or if the only program running on the computer is compute-intensive, the method proceeds to step 306. In step 306, the clock speed of the computer system is increased (if not already at full speed), and the number of memory access wait states of the system is adjusted. Wait states, however, must be adjusted prior to increasing clock speed. The clock speed is increased because the program(s) running on the computer is largely compute intensive, such that the processor speed is important in determining the speed at which the programs will be run, to match the memory access timing. Furthermore, desirably the number of memory access wait states is increased. The method also then ends at step 308.

Desirably, in one embodiment of the invention, the dynamic memory timing taught in co-assigned U.S. patent application Ser. No. 08/529,237, which is hereby incorporated by reference, is utilized to adjust processor speed and the number of memory wait states as needed. Thus, the number of clock cycles that the system/memory controller would be programmed to use for system memory access would be adjusted whenever the clock speed of the processor was adjusted, pursuant to this U.S. patent application. The new number of clock cycles used would desirably be the lowest number possible based on the new clock speed and the worst-case access time of the system memory subsystem.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

I claim:

1. A method for conserving power in a power-managed computer system on which a computer program is running, the method comprising the steps of:
   determining whether a nature of the computer program is substantially compute-intensive or substantially memory intensive;
   increasing the clock speed of the computer system and adjusting the number of memory access wait states of the computer system incident to determining that the nature of the computer program is substantially compute-intensive; and,
   decreasing the clock speed of the computer system and adjusting the number of memory access wait states of the computer system incident to determining that the nature of the computer program is substantially memory-intensive.

2. The method of claim 1, wherein the computer has a central processing unit and a memory subsystem, and the step of determining whether the nature of the computer program is substantially memory-intensive or substantially compute-intensive monitors activity level of the central processing unit and activity level of the memory subsystem.

3. The method of claim 1, wherein the step of determining whether the nature of the computer program is substantially memory-intensive or substantially compute-intensive comprises receiving input from a user of the computer system as to whether the nature of the computer program is substantially memory-intensive or substantially compute-intensive.

4. The method of claim 1, wherein the step of increasing the clock speed of the computer system and adjusting the number of memory access wait states of the computer system increases the number of memory access wait states of the computer system.

5. The method of claim 1, wherein the step of decreasing the clock speed of the computer system and adjusting the number of memory access wait states of the computer system decreases the number of memory access wait states of the computer system.

6. An information handling system on which a computer program can be run comprising:
   a central processing unit capable of operating at least two clock speeds;
   a memory subsystem having at least one memory access wait state; and,
   a power-management system coupled to the central processing unit and the memory subsystem, for adjusting the speed of the central processing unit and the number of memory access wait states of the memory incident to determining whether the computer program is substantially memory-intensive or substantially compute-intensive.

7. The information handling system of claim 6, wherein the power-management system monitors activity level of the central processing unit and activity level of the memory subsystem to determine whether the computer program is substantially memory-intensive or substantially compute-intensive.

8. The information handling system of claim 6, wherein the power-management system receives input from a user of the computer system to determine whether the computer program is substantially memory-intensive or substantially compute-intensive.

9. The information handling system of claim 6, wherein the power-management system increases the clock speed of the central processing unit incident to determining that the computer program is substantially compute-intensive.

10. The information handling system of claim 6, wherein the power-management system increases the number of memory access wait states of the memory incident to determining that the computer program is substantially compute-intensive.

11. The information handling system of claim 6, wherein the power-management system decreases the clock speed of the central processing unit incident to determining that the computer program is substantially memory-intensive.

12. The information handling system of claim 6, wherein the power-management system decreases the number of memory access wait states of the memory incident to determining that the computer program is substantially memory-intensive.

13. A computer-readable medium with instructions stored thereon comprising a power-management computer program executable on a power-managed computer system on which at least one other computer program can be run, the power-management program comprising:
   means for determining whether the other program is substantially memory-intensive or substantially compute-intensive;
   means for increasing the clock speed of the computer system and adjusting the number of memory access wait states of the computer system incident to determining that the second program is substantially compute-intensive; and,
   means for decreasing the clock speed of the computer system and adjusting the number of memory access wait states of the computer system incident to determining that the second program is substantially memory-intensive.

14. The medium of claim 13, wherein the medium is a floppy disk insertable in a floppy disk drive of the computer system.

15. The medium of claim 13, wherein the means for determining whether the second program is substantially memory-intensive or substantially compute-intensive receives input from a user of the computer system as to whether the second program is substantially memory-intensive or substantially compute-intensive.

16. The medium of claim 13, wherein the means for increasing the clock speed of the computer system and adjusting the number of memory access wait states of the computer system increases the number of memory access wait states of the computer system.

17. The medium of claim 13, wherein the means for decreasing the clock speed of the computer system and adjusting the number of memory access wait states of the computer system decreases the number of memory access wait states of the computer system.

* * * * *